United States Patent [19]

Ferguson et al.

[11] Patent Number: 5,032,095
[45] Date of Patent: Jul. 16, 1991

[54] MARINE ENGINE WITH GALVANIC CIRCUIT PROTECTION

[75] Inventors: Arthur R. Ferguson, Northbrook; Edgar Rose, Glencoe, both of Ill.

[73] Assignee: Outboard Marine Corporation, Waukegan, Ill.

[21] Appl. No.: 367,858

[22] Filed: Jun. 19, 1989

Related U.S. Application Data

[63] Continuation-in-part of Ser. No. 248,153, Sep. 23, 1988, abandoned.

[51] Int. Cl.⁵ ............................................. B63H 5/12
[52] U.S. Cl. .................................... 440/89; 60/321
[58] Field of Search .................. 440/88, 89; 60/310, 60/321; 123/41.31, 41.08; 181/261

[56] References Cited

U.S. PATENT DOCUMENTS

| | | | |
|---|---|---|---|
| 3,431,882 | 3/1969 | Irgens | 440/88 |
| 3,541,786 | 11/1970 | Sarra | 60/310 |
| 3,759,041 | 9/1973 | North et al. | 60/310 |
| 3,921,398 | 11/1975 | Kashmerick | 440/89 |
| 3,968,767 | 7/1976 | Blanchard | 440/88 |
| 4,212,281 | 7/1980 | Ernest | 123/193 H |
| 4,399,797 | 8/1983 | Iwai | 123/41.31 |
| 4,759,181 | 7/1988 | Biritz | 123/41.08 |
| 4,831,822 | 5/1989 | Yoshimura | 60/310 |

Primary Examiner—Jesús D. Sotelo
Attorney, Agent, or Firm—Michael, Best & Friedrich

[57] ABSTRACT

Disclosed herein is a stern drive unit comprising an engine including a coolant jacket and an exhaust port, an exhaust gas discharge system including an exhaust gas manifold communicating with the exhaust port, a high-rise elbow communicating with the exhaust gas manifold, and an exhaust pipe communicating with the high-rise elbow and adapted to convey exhaust gas to an overboard discharge, a high-rise elbow and exhaust gas manifold coolant jacket surrounding the exhaust gas manifold and at least partially surrounding the high-rise elbow and communicating with the exhaust pipe for discharge of coolant from the high-rise elbow and exhaust gas manifold coolant jacket and through the exhaust pipe to an overboard discharge, which high-rise elbow and exhaust gas manifold coolant jacket includes a coolant discharge surface over which coolant is discharged from the high-rise elbow and exhaust gas manifold coolant jacket for flow to the exhaust pipe, a coolant conduit communicating between the engine coolant jacket and the high-rise elbow and exhaust gas manifold coolant jacket and including a portion extending at least as high as the discharge surface of the high-rise elbow and exhaust gas manifold coolant jacket and over which coolant flows, and a supply conduit for supplying coolant to the engine coolant jacket in response to engine operation.

10 Claims, 2 Drawing Sheets

MARINE ENGINE WITH GALVANIC CIRCUIT PROTECTION

This application is a continuation-in-part of application Ser. No. 07/248,153, filed Sept. 23, 1988, now abandoned.

BACKGROUND OF THE INVENTION

The invention relates generally to marine propulsion devices, and, more specifically, to in-board marine engine installations and to stern drive installations or units. Still more particularly, the invention relates to a galvanic corrosion of parts which are fabricated of dissimilar metals and which are included in such in-board marine engine or stern drive installations.

The invention is also directed to reducing or eliminating galvanic corrosion when an engine is not running.

Attention is directed to the following U.S. Pat. Nos.:
Irgens 3,431,882
Sarra 3,541,786
Kashmerick 3,921,398
Blanchard 3,968,767
Iwai 4,399,797

SUMMARY OF THE INVENTION

The invention provides an internal combustion engine including a first component fabricated of a first metal and including a first water jacket, a second component fabricated of a second metal dissimilar to the first metal and including a second water jacket, and a conduit connecting the first and second components and including a portion extending above the water jackets and being the sole connection affording coolant flow between the first and second water jackets.

In one embodiment of the invention, the first compartment is a closed deck engine block and the second compartment is a cylinder head.

The invention also provides an engine adapted for marine use and comprising an engine including a coolant jacket and an exhaust gas port, an exhaust gas discharge system including a high-rise elbow communicating with the exhaust gas port, and an exhaust pipe communicating with the high-rise elbow and adapted to convey exhaust gas to a overboard discharge, a high-rise elbow coolant jacket at least partially surrounding the high-rise elbow and communicating with the exhaust pipe for discharge of coolant from the high-rise elbow coolant jacket and through the exhaust pipe to an overboard discharge, which high-rise elbow coolant jacket includes a coolant discharge surface over which coolant is discharged from the high-rise coolant jacket for flow to the exhaust pipe, a coolant conduit communicating between the engine coolant jacket and the high-rise elbow coolant jacket and including a portion extending at least as high as the coolant discharge surface of the high-rise elbow coolant jacket and over which coolant flows, and means for supplying coolant to the engine coolant jacket.

The invention also provides a stern drive unit comprising an engine including a coolant jacket and an exhaust gas port, an exhaust gas discharge system including a high-rise elbow communicating with the exhaust gas port, and an exhaust pipe communicating with the high-rise elbow and adapted to convey exhaust gas to an overboard discharge, a high-rise elbow coolant jacket at least partially surrounding the high-rise elbow and communicating with the exhaust pipe for discharge of coolant from the high-rise elbow coolant jacket and through the exhaust pipe to an overboard discharge, which high-rise elbow coolant jacket includes a coolant discharge surface over which coolant is discharged from the high-rise coolant jacket for flow to the exhaust pipe, a coolant conduit communicating between the engine coolant jacket and the high-rise elbow coolant jacket and including a portion extending at least as high as the coolant discharge surface of the high-rise elbow coolant jacket and over which coolant flows, and means for supplying coolant to the engine coolant jacket.

The invention also provides a stern drive unit comprising an engine including a coolant jacket and an exhaust port, an exhaust gas discharge system including an exhaust gas manifold communicating with the exhaust port, a high-rise elbow communicating with the exhaust gas manifold, and an exhaust pipe communicating with the high-rise elbow and adapted to convey exhaust gas to an overboard discharge, a high-rise elbow and exhaust gas manifold coolant jacket surrounding the exhaust gas manifold and at least partially surrounding the high-rise elbow and communicating with the exhaust pipe for discharge of coolant from the high-rise elbow and exhaust gas manifold coolant jacket and through the exhaust pipe to an overboard discharge, which high-rise elbow and exhaust gas manifold coolant jacket includes a coolant discharge surface over which coolant is discharged from the high-rise elbow and exhaust gas manifold coolant jacket for flow to the exhaust pipe, a coolant conduit communicating between the engine coolant jacket and the high-rise elbow and exhaust gas manifold coolant jacket and including a portion extending at least as high as the discharge surface of the high-rise elbow and exhaust gas manifold coolant jacket and over which coolant flows, and a supply conduit for supplying coolant to the engine coolant jacket in response to engine operation.

Other features and advantages of the invention will become apparent to those skilled in the art upon review of the following detained description, claims and drawings.

THE DRAWINGS

Figure 1:
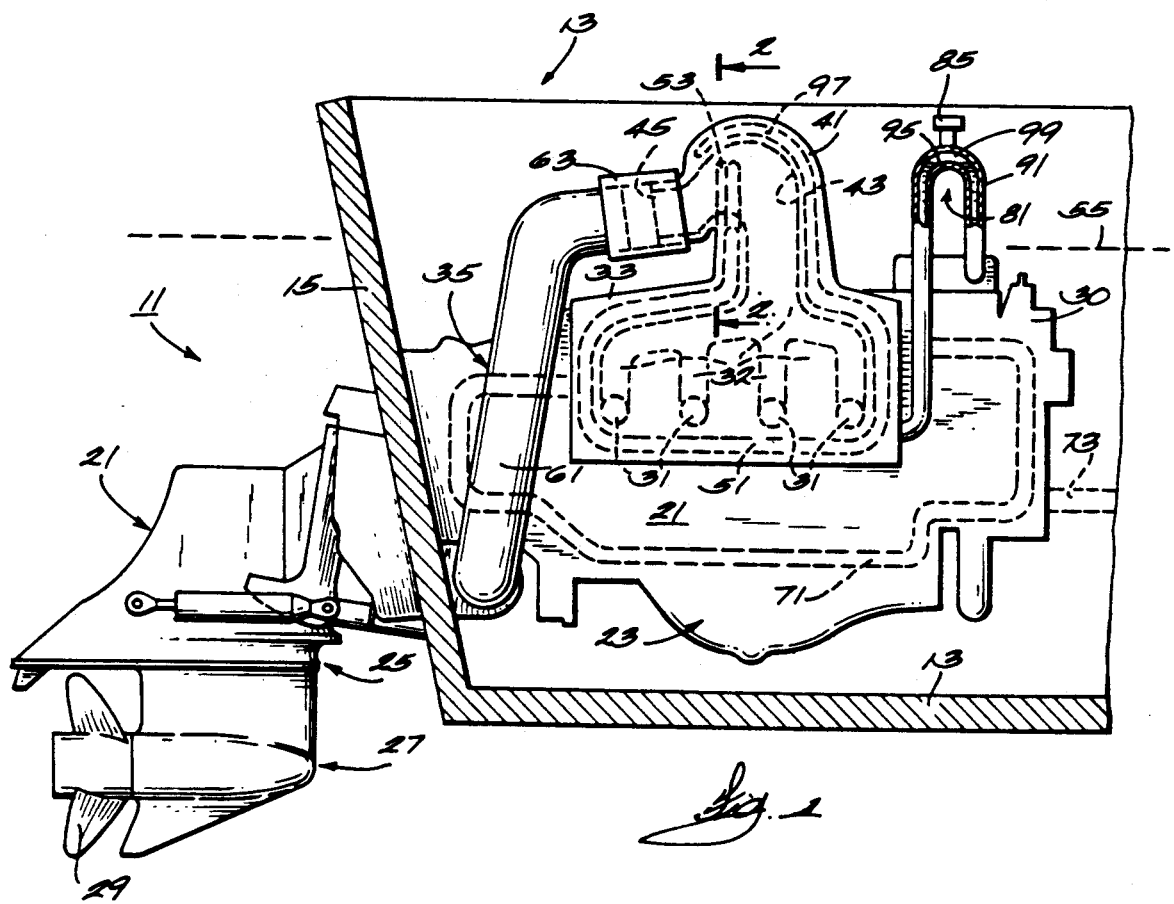
FIG. 1 is an elevational view, partially in section, of one embodiment of the invention.

Before one embodiment of the invention is explained in detail, it is to be understood that the invention is not limited in its application to the details of the construction and the arrangements of components set forth in the following description or illustrated in the drawings. The invention is capable other embodiments and of being practiced or being carried out in various ways. Also, it is to be understood that the phraseology and terminology used herein is for the purpose of description and should not be regarded as limiting.

GENERAL DESCRIPTION

Shown in the drawings is a stern drive installation 11 including a boat 13 having a transom 15. Also, forming a part of the stern drive installation 11 is a stern drive unit 21 including an engine 23 which is suitably mounted in the boat 13 and a drive unit 25 which is suitably supported aft of the transom 15 and which includes a steerable and tiltable lower unit 27 carrying a propeller 29 driven by the engine 23.

The engine 23 is preferably fabricated of iron and comprises an engine block 30 including a plurality of cylinders (not shown) including respective exhaust ports 31 which communicates with interior ducting 32 in an exhaust gas manifold 33 which is suitably connected to the engine block and which forms part of an exhaust gas discharge system 35.

The exhaust gas discharge system 35 also includes a high-rise elbow 41 which includes an interior exhaust gas conduit 43 communicating with the interior ducting 32 in the exhaust gas manifold 33 for receipt therefrom of exhausts gas and which also includes an exhaust gas outlet 45 communicating with the interior conduit 43.

The high-rise elbow 41 and the exhaust gas manifold 33 incorporate therein an exhaust gas coolant jacket 51 which includes (see FIG. 2) a discharge surface 53 over which coolant is discharged from the jacket 51 for flow through an exhaust pipe (still to be described) to an overboard discharge. The discharge surface 53 is located above the normal water level outside the boat 13 when the boat 13 is at rest, which water level is indicated at 55.

The high-rise elbow 41 and exhaust gas manifold 33 are preferably integrated into a single unit and are preferably fabricated of aluminum.

In addition, the exhaust gas discharge system 35 also includes an exhaust gas discharge pipe 61 which leads to a suitable overboard discharge (not shown) and which is connected, through a short section of rubber hose 63, with the exhaust gas outlet 45 of the high-rise elbow 41.

The engine 23 also includes a coolant jacket 71 which is distinct from the exhaust gas coolant jacket 51 and means, preferably including a pump (not shown) driven by the engine 33 and a suitable supply conduit 73 (shown schematically), for supplying the engine coolant jacket 71 with coolant, preferably the water in which the boat 13 is floating when the engine 23 is operating.

The engine 23 also includes a conduit or duct 81 extending between the engine coolant jacket 71 and the exhaust gas coolant jacket 51 for supplying coolant to the exhaust gas coolant jacket 51 from the engine cooling jacket 71, which conduit 81 can be a rubber hose. More particularly, the conduit 81 preferably extends from any suitable connection with the engine coolant jacket 71 to the bottom of the exhaust gas coolant jacket 51 in the exhaust gas manifold 33.

As thus far disclosed, the construction is conventional.

The engine 23 also includes arrangement of the coolant conduit means connecting the engine coolant jacket 71 to the exhaust gas coolant jacket 51 so as to electrically disconnect any current path through the coolant between the high-rise elbow and the exhaust gas manifold unit and the engine block 30 by preventing electrical current flow between the exhaust gas coolant jacket 51 and the engine coolant jacket 71 through the coolant in the conduit 81 extending between the engine coolant jacket 71 and the exhaust gas coolant jacket 51.

While other constructions can be employed, in the disclosed construction, such means comprises locating a part or portion of the conduit or hose 81 at least as high as the discharge surface 53 of the exhaust gas coolant jacket 51 and above the normal water level outside the boat when the boat is at rest, which water level is indicated at 55. More specifically in the disclosed construction, the hose or conduit 81 includes a top portion 91 which is generally of inverted "U" shape and which has an interior surface 95 over which water flows or passes from the engine coolant jacket 71 to the exhaust gas coolant jacket 51 and which is located, as already indicated, above the exterior water level 55 and at least as high as the discharge surface 53 of the exhaust gas coolant jacket 51.

As a consequence, when the engine 23 is not running, water in the exhaust gas coolant jacket 51 will drain overboard through the exhaust pipe 61 until the water level in the exhaust gas coolant jacket 51 falls to the level of the discharge surface 53. Because it is likely that, in the absence of the disclosed invention, coolant water will also drain from the engine coolant jacket 71 through the supply conduit 73 to the exterior water, it is also possible that sooner or later the coolant water will drain below the discharge surface 53 of the exhaust gas cooling jacket 51 and down to the exterior water level 55, while at the same time, providing an electrical current path through the coolant between the engine cooling jacket 71 and the exhaust gas cooling jacket 51.

The employment of the inverted "U" shaped conduit portion 91 and the location of the surface 95 at least as high as the discharge surface 53 limits drainage through the conduit 81 from the exhaust gas coolant jacket 51 (thereby desirably maintaining the exhaust gas coolant jacket 51 substantially full of water) while at the same time, affording sufficient drainage to prevent continuous presence of coolant between the exhaust gas manifold coolant jacket 51 and the engine cooling jacket 71.

It is noted that coolant in the discharge pipe 61 and in the engine coolant jacket 71 will drain until the level thereof is approximately the same as the exterior water level 55.

As a result, two air pockets 97 and 99 are provided, the pocket 97 being located between the exhaust pipe 61 and the exhaust gas coolant jacket 71 and the other pocket 99 being located in the conduit 81 between the interior surface 95 in the conduit 81 and the coolant level in the engine water jacket 71.

If drainage of the engine coolant jacket 71 through the supply conduit 73 does not readily occur, the air pocket 99 can be provided, when the engine is not running, by providing the top portion 91 of the conduit 81 with a one-way valve 85 which serves to admit air into the conduit 81 in response to a low pressure condition created therein by reason of discharge of coolant from the exhaust gas cooling jacket 51 to the level of the discharge surface 53 when the engine is not running.

Although the exhaust gas discharge coolant jacket at least partially surrounds both the exhaust gas manifold 33 and the high-rise elbow 41, at least some of the advantages of the invention can be obtained if the exhaust gas coolant jacket 51 extends only partially around one of the exhaust gas manifold 33 and the high-rise elbow 41.

Interrupting the electrical current path through the coolant between the exhaust gas coolant jacket 51 and the engine coolant jacket 71 serves, particularly when the boat is floating in sea water, to diminish electrolytic or galvanic corrosion when the high-rise elbow 41 and exhaust gas manifold 33 are formed of aluminum and the engine block 30 is formed of iron. The disclosed construction insures that when the engine 23 is not running, the air pockets 97 and 99 are respectively created in both the high-rise exhaust elbow 41 and in the cooling water hose 81.

In addition, the disclosed system allows the exhaust manifold 33 and high-rise elbow 41, on the one hand, and engine block 30, on the other hand, to be made of dissimilar metals without the problem of galvanic corrosion in sea water. Specifically, while the exhaust gas manifold 33 and high-rise elbow 41 and the engine are electrically connected through their mating connecting surfaces, completion of the electrical loop through the sea water is not made because of the respective air pockets 97 and 99 at both ends of the exhaust gas coolant jacket 51.

Figure 3:
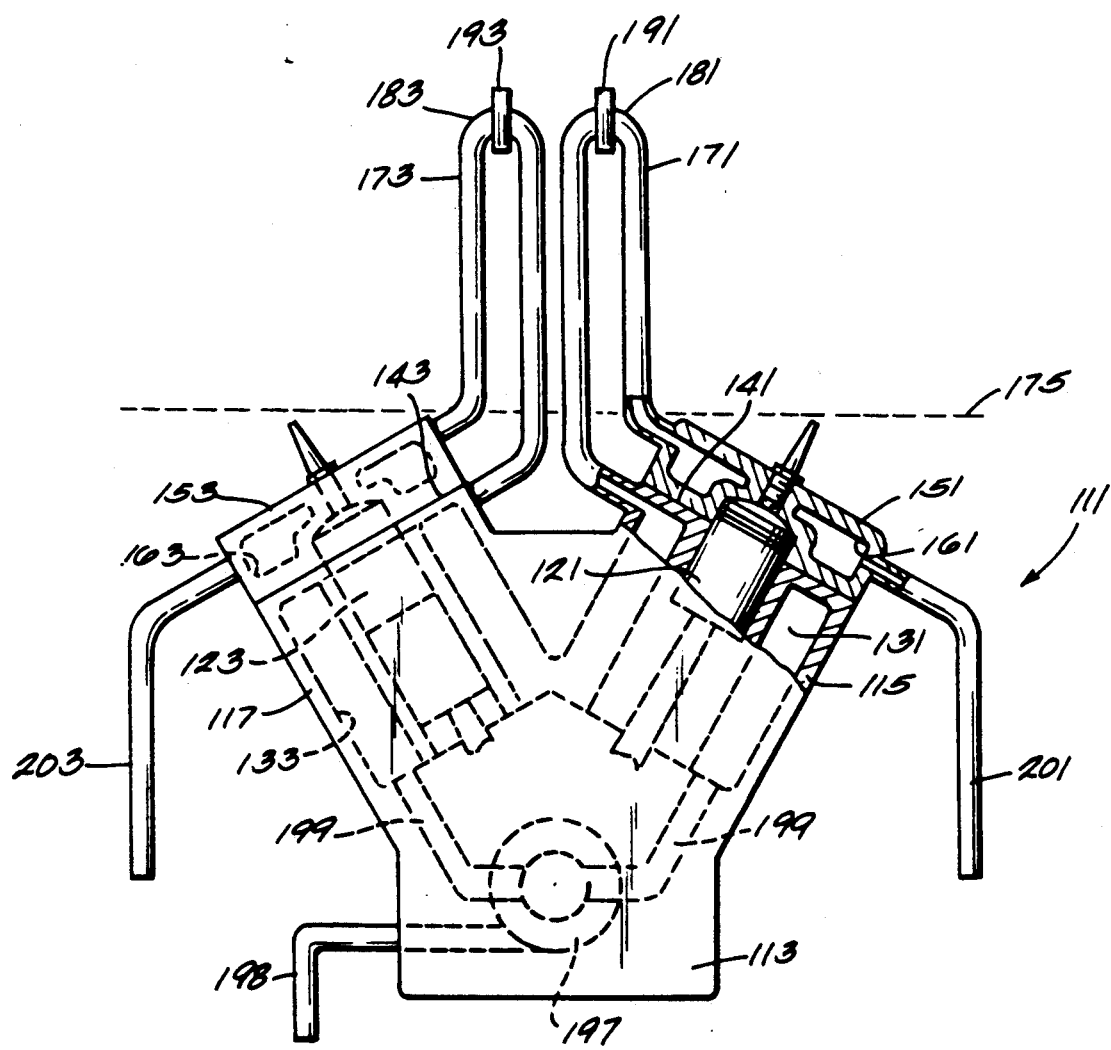
FIG. 3 is a schematic view, partially in section, of a second embodiment of the invention.

Another embodiment of the invention is shown schematically in FIG. 3 which illustrates an internal combustion engine 111 adapted to be mounted in a boat (not shown) and including a V-block 113 including two cylinder banks 115 and 117 respectively including one or more cylinders 121 and 123 and respective water jackets 131 and 133 in surrounding relation to the cylinders 121 and 123. Preferably, the cylinder banks 115 and 117 are of the closed deck type, i.e., the cylinders 121 and 123 open through the respective top surfaces 141 and 143 of the cylinder banks 115 and 117 but the water jackets 131 and 133 do not, as is known in internal combustion engine construction.

Suitably attached to each of the cylinder banks are respective cylinder heads 151 and 153 including respective suitable water jackets 161 and 163.

Means (not shown) are also provided for respectively suitably fixedly attaching the cylinder heads 151 and 153 to the cylinder banks 115 and 117.

Connecting the water jackets 131 and 133 in the cylinder banks 115 and 117 with the water jackets 161 and 163 in the cylinder heads 151 and 153 are respective conduits 171 and 173 which extend above the tops of the water jackets 161 and 163 and above the static water level 175 in which the boat is floating. Preferably the conduits 171 and 173 respectively include, at respective upper portions 181 and 183 thereof, respective one-way valves 191 and 193 which prevent outward fluid flow of coolant from the conduits 171 and 173 and permit flow of air into the conduits 171 and 173 in the event of loss of pressure in the conduits 171 and 173 of coolant such as can occur in response to drainage from the water jackets 131, 133, 161 and 163. Entry of such air into the conduits 171 and 173 when the engine is not running interrupts the respective galvanic circuits between the cylinder heads 151 and 153 and the engine block 113 and permits corrosion of the less noble metal when the cylinder block 113 and cylinder heads 151 and 153 are made of dissimilar metals, i.e., as for instance, when the engine block 113 is made of ferrous material and the cylinder heads 151 and 153 are made of aluminum.

Thus, the use of the disclosed conduits 171 and 173 (and the use of closed deck cylinder block 113) facilitates engine construction including an engine block of a ferrous material and cylinder heads of aluminum material.

Any suitable arrangement, including a coolant pump 197, an intake line 198, and one or more supply lines 199, can be employed for supplying coolant to one or both of the water jackets 131 and 133 and any suitable drainage conduit or arrangement 201 and 203 can be employed for draining or discharging coolant from the cylinder head water jackets 161 and 163.

Figure 2:
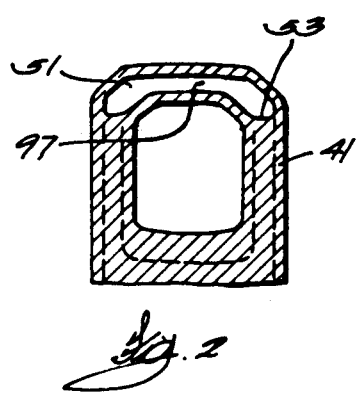
FIG. 2 is an enlarged view taken along line 2—2 of FIG. 1.

Both the arrangement for interrupting a galvanic circuit between an engine block 30 and an engine exhaust gas manifold 33 as disclosed in FIGS. 1 and 2 and the arrangement disclosed in FIG. 3 for interrupting a galvanic circuit between a closed deck engine block 113 of one metal and an associated cylinder head 151 and/or 153 of another metal can be employed in the same engine. Even more importantly, the disclosed arrangement affords interruption of a galvanic circuit between any two engine parts which are made of dissimilar metals and which respectively include water jackets connected in series.

Various of the features of the invention are set forth in the following claims:

We claim:

1. An internal combustion engine including a first component fabricated of a first metal and including a first water jacket, a second component fabricated of a second metal dissimilar to said first metal and including a second water jacket separate from said first water jacket, and a conduit connecting said first and second water jackets and including a portion extending above the water level in the second water jacket when the engine is not running and being the sole connection affording coolant flow from said first water jacket to said second water jacket.

2. An internal combustion engine in accordance with claim 1 and further including means for supplying coolant to one of said water jackets and means for drainage fluid from the other of said water jackets.

3. An internal combustion engine in accordance with claim 1 wherein said engine is mounted in a boat and said conduit portion extends above the normal level of the water in which the boat is floating.

4. An internal combustion engine in accordance with claim 1 wherein said first component is a closed deck engine block and said second component is a cylinder head.

5. An engine adapted for marine usage and comprising an engine block including a coolant jacket and an exhaust gas port, an exhaust gas discharge system including a high-rise elbow communicating with said exhaust gas port and an exhaust pipe communicating with said high-rise elbow and adapted to convey exhaust gas to an overboard discharge, a high-rise elbow coolant jacket at least partially surrounding said high-rise elbow and communicating with said exhaust pipe for discharge of coolant from said high-rise elbow coolant jacket and through said exhaust pipe to an overboard discharge, said high-rise elbow coolant jacket including a coolant discharge surface which functions to determine coolant level in said high-rise coolant jacket when the engine is not running and over which coolant flows, a coolant conduit communicating between said engine coolant jacket and said high-rise elbow coolant jacket and including a portion extending at least as high as said coolant discharge surface of said high-rise elbow coolant jacket and over which coolant flows, and means for supplying coolant to said engine coolant jacket.

6. A stern drive unit comprising an engine including a coolant jacket and an exhaust gas port, an exhaust gas discharge system including a high-rise elbow communicating with said exhaust gas port and an exhaust pipe communicating with said high-rise elbow and adapted to convey exhaust gas to an overboard discharge, a high-rise elbow coolant jacket at least partially surrounding said high-rise elbow and communicating with said exhaust pipe for discharge of coolant from said high-rise elbow coolant jacket and through said exhaust pipe to an overboard discharge, said high-rise elbow coolant jacket including a coolant discharge surface which functions to determine coolant level in said high-rise coolant jacket when the engine is not running and over which coolant flows, a coolant conduit communicating between said engine coolant jacket and said high-rise elbow coolant jacket and including a portion extending at least as high as said coolant discharge surface of said high-rise elbow coolant jacket and over which coolant flows, and means for supplying coolant to said engine coolant jacket.

7. A stern drive unit in accordance with claim 6 wherein said coolant conduit portion is of inverted U-shape portion and includes a surface which is located at least as high as said discharge surface and over which coolant flows.

8. A stern drive in accordance with claim 7 and further including a one-way valve communicating with said conduit portion, preventing flow from said conduit portion, and permitting air flow to said conduit portion in response to the presence in said conduit portion of a low pressure condition.

9. A stern drive unit in accordance with claim 6 wherein said stern drive unit is carried in a boat normally floating in water at a normal water level when said boat is at rest, and wherein said discharge surface is above said normal water level.

10. A stern drive unit comprising an engine including a coolant jacket and an exhaust port, an exhaust gas discharge system including an exhaust gas manifold communicating with said exhaust port, a high-rise elbow communicating with said exhaust gas manifold, and an exhaust pipe communicating with said high-rise elbow and adapted to convey exhaust gas to an overboard discharge, a high-rise elbow and exhaust gas manifold coolant jacket surrounding said exhaust gas manifold and at least partially surrounding said high-rise elbow and communicating with said exhaust pipe for discharge of coolant from said high-rise elbow and exhaust gas manifold coolant jacket and through said exhaust pipe to an overboard discharge, said high-rise elbow and exhaust gas manifold coolant jacket including a coolant discharge surface which functions to determine coolant level in said high-rise coolant jacket when the engine is not running and over which coolant flows, a coolant conduit communicating between said engine coolant jacket and said high-rise elbow and exhaust gas manifold coolant jacket and including a portion extending at least as high as said discharge surface of said high-rise elbow and exhaust gas manifold coolant jacket and over which coolant flows, and a supply conduit for supplying coolant to said engine coolant jacket in response to engine operation.

* * * * *